US008773955B2

(12) United States Patent
Baba

(10) Patent No.: US 8,773,955 B2
(45) Date of Patent: Jul. 8, 2014

(54) TIME ADJUSTMENT DEVICE, TIMEKEEPING DEVICE WITH A TIME ADJUSTMENT DEVICE, AND TIME ADJUSTMENT METHOD

(75) Inventor: Norimitsu Baba, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 348 days.

(21) Appl. No.: 13/351,982

(22) Filed: Jan. 17, 2012

(65) Prior Publication Data

US 2012/0188854 A1 Jul. 26, 2012

(30) Foreign Application Priority Data

Jan. 20, 2011 (JP) ................................ 2011-010196

(51) Int. Cl.

*G01S 19/01* (2010.01)
*G01S 19/34* (2010.01)
*G04C 11/02* (2006.01)
*G04C 9/02* (2006.01)

(52) U.S. Cl.

USPC ........................................ 368/47; 342/357.39

(58) Field of Classification Search

USPC ............... 368/47, 14, 46; 342/357.39, 357.48
See application file for complete search history.

(56) References Cited

U.S. PATENT DOCUMENTS

| | | | | |
|---|---|---|---|---|
| 7,649,812 | B2 | 1/2010 | Baba | |
| 8,276,178 | B2 * | 9/2012 | Song et al. | 725/62 |
| 8,542,557 | B2 * | 9/2013 | Oh | 368/21 |
| 8,589,772 | B2 * | 11/2013 | Song et al. | 714/784 |
| 2010/0225493 | A1 * | 9/2010 | Zishaan | 340/627 |

FOREIGN PATENT DOCUMENTS

| | | | |
|---|---|---|---|
| JP | 2009-145318 | A | 7/2009 |
| JP | 2011-033381 | A | 2/2011 |

* cited by examiner

*Primary Examiner* — Sean Kayes

(57) ABSTRACT

A time adjustment device can acquire time information in a short time, reduce power consumption, and display the correct time. A GPS wristwatch has a reception unit that receives satellite signals; a time information generating unit that generates internal time information; a reception control unit that controls the reception unit; and a time information adjustment unit that adjusts the internal time information. The time information adjustment unit has a first information time adjustment means that receives first information containing year, month, day, hour, minute, second, and satellite health information, and adjusts the internal time information; a second information time adjustment means that receives second information including leap second information, and adjusts the internal time information; a third information time adjustment means that receives third information of hour, minute, second information, and adjusts the internal time information.

8 Claims, 13 Drawing Sheets

| No | CUMULATIVE SUBFRAME NUMBER | GPS TIME | HOUR | MINUTE | SECOND | DAY |
|---|---|---|---|---|---|---|
| 1 | 89 | 528 | 0 | 8 | 48 | SUN |
| 2 | 214 | 1278 | 0 | 21 | 18 | SUN |
| 3 | 339 | 2028 | 0 | 33 | 48 | SUN |
| 4 | 464 | 2778 | 0 | 46 | 18 | SUN |
| 5 | 589 | 3528 | 0 | 58 | 48 | SUN |
| : | : | : | : | : | : | : |
| 802 | 100214 | 601278 | 23 | 1 | 18 | SAT |
| 803 | 100339 | 602028 | 23 | 13 | 48 | SAT |
| 804 | 100464 | 602778 | 23 | 26 | 18 | SAT |
| 805 | 100589 | 603528 | 23 | 38 | 48 | SAT |
| 806 | 100714 | 604278 | 23 | 51 | 18 | SAT |

FIG. 7

TIME ADJUSTMENT DEVICE, TIMEKEEPING DEVICE WITH A TIME ADJUSTMENT DEVICE, AND TIME ADJUSTMENT METHOD

CROSS-REFERENCE TO RELATED APPLICATION

The entire disclosure of Japanese Patent Application No. 2011-010196, filed Jan. 20, 2011 is expressly incorporated by reference herein.

BACKGROUND

1. Technical Field

The present invention relates to a time adjustment device that corrects the time based on signals from positioning information satellites such as GPS satellites, to a timekeeping device having the time adjustment device, and to a time adjustment method.

2. Related Art

GPS satellites that circle the Earth on known orbits are used in the Global Positioning System (GPS), which is a system for determining one's location, and each GPS satellite carries an atomic clock. Each GPS satellite therefore maintains extremely accurate time information (referred to herein as satellite time information).

Electronic timepieces that adjust the time using time information (satellite time information) from GPS satellites are also known from the literature. See, for example, Japanese Unexamined Patent Appl. Pub. JP-A-2009-145318.

JP-A-2009-145318 describes a device that can select either of two reception modes, a first mode that receives first information composed of the hour-minute-second (Z count) information from the satellite signal, and a second mode that receives second information containing hour-minute-second information, week information including the year, month, and day, and satellite health information.

Once the time has been adjusted using the second information, the time is subsequently adjusted by receiving only the first information, but if the time has not adjusted using the second information, the second information is received to adjust the time.

As a result, only the first information needs to be received once the time has been adjusted using the second information. Time information can therefore be received in a short time compared with when the second information is received, and power consumption can be reduced.

The time information (satellite time information) received from a GPS satellite does not reflect leap seconds, and UTC (Universal Coordinated Time) must therefore be acquired by adding the cumulative leap seconds.

In JP-A-2009-145318, this cumulative leap second value is fixed. As a result, when the leap second count is updated and added to UTC, the internal time of the timepiece will differ from UTC and the correct time cannot be displayed.

Current leap second information is carried in subframe 4, page 18 of the GPS signal, and the correct time can be set if this leap second information is received.

However, the leap second information is transmitted every 12.5 minutes, and the reception process must continue for at most 12.5 minutes in order to receive the leap second information when adjusting the time.

The reception process therefore takes longer and power consumption increases, thus shortening the duration time of small mobile devices with low battery capacity, such as wristwatches.

SUMMARY

A time adjustment device, a timekeeping device with a time adjustment device, and a time adjustment method according to the invention can acquire time information in a short time, reduce power consumption, and display the correct time.

One aspect of the invention is a time adjustment device including a reception unit that receives satellite signals transmitted from positioning information satellites; a time information generating unit that generates internal time information; a time information adjustment unit that adjusts the internal time information; and a reception control unit that controls operation of the reception unit; wherein satellite time information that is kept by the positioning information satellites is contained in the satellite signal. The reception unit can select a first reception mode that receives first information including hour, minute, and second information, week information for the year, month, and day, and satellite health information from the satellite signal, a second reception mode that receives second information including leap second information in the satellite signal, and a third reception mode that receives third information including hour, minute, and second information in the satellite signal. The leap second information in the second information includes at least current leap second information. The time information adjustment unit includes a first information time adjustment means that receives the first information by the reception control unit controlling the reception unit in the first reception mode, and adjusts the year, month, day, hour, minute, and second of the internal time information based on the received first information, a second information time adjustment means that receives the second information by the reception control unit controlling the reception unit in the second reception mode, and adjusts the internal time information based on the received second information, a third information time adjustment means that receives the third information by the reception control unit controlling the reception unit in the third reception mode, and adjusts the hour, minute, second of the internal time information based on the received third information and leap second information, and a time adjustment recording means that records in a storage unit if the internal time information was adjusting using the first information, and if the internal time information was adjusting using the second information, after the internal time information was initialized. The first information time adjustment means operates if adjustment of the internal time information by the first information is not recorded in the storage unit, the second information time adjustment means operates if adjustment of the internal time information by the first information is recorded and adjustment by the second information is not recorded in the storage unit, and the third information time adjustment means operates if adjustment of the internal time information by the first information and second information is recorded in the storage unit.

When the time has not been set using the first information after the internal time information has been initialized by a system reset, such as the first time the time is set after the internal time information is initialized, first information (year, month, day, hour, minute, second information plus satellite (SV) health information) is received by a first information time adjustment means. The correct time can therefore be set immediately after the internal time is initialized even if the internal time differs greatly from the actual current time.

However, if the time has already been set using the first information, the year, month, and day of the internal time are also set correctly, and the year, month, and day are thereafter likely to remain correct. As a result, the internal time can be adjusted using the second information including the current leap second, and the correct internal time can be set by receiving only the second information. If the hour, minute, second information is also contained in the second information, the internal time can be corrected using this hour, minute, second information. If the hour, minute, second information is not contained in the second information, the internal time can be updated using the hour, minute, second information received in the first information, and the internal time that is updated by a reference signal can be adjusted using the leap second information in the second information.

Because the current leap second information can also be acquired if the time is adjusted using the first information and the second information, if only the third information, that is, the hour, minute, second, is received, the internal time can be adjusted correctly using the previously acquired leap second information.

Because the first information and second information are received once after the internal time is initialized, and only the third information normally needs to be received thereafter, the average reception time can be significantly shortened compared with an electronic timepiece that always receives the first information and second information during reception.

As a result, power consumption can be reduced and the duration time of the power supply can be increased. Therefore, when the time adjustment device of the invention is incorporated in a mobile timekeeping device such as a wristwatch, the timekeeping device can be used for a long time, improving convenience.

Furthermore, because satellite health information is also contained in the first information, whether the received first information is correct can be easily determined, and the internal time can be set based on correct time information.

After the first time, the reception process time can be shortened because receiving only the third information is usually sufficient. User convenience is therefore not impaired even if the time adjustment device must be left still during reception because the reception time is short.

In a time adjustment device according to another aspect of the invention, the time information adjustment unit preferably sets the record of internal time being adjusted by the second information in the storage unit to not-adjusted when the internal time information reaches a previously set specific time.

The specific date and time are preferably a date and time when the leap second may be updated, such as 00:00:00 on 7/1 or 1/1. Setting the record of internal time being adjusted by the second information in the storage unit to not-adjusted means changing a record of adjustment based on the second information to not-adjusted, and if there is not a record of adjustment based on the second information, maintaining that state.

The last day of December and June are the first choice for inserting a leap second to UTC. If the record of adjusting the internal time by the second information is set to not-adjusted at the specific date and time, the second time information adjustment means operates for the next reception process to receive the second information again. As a result, if a leap second is inserted at the above timing, the current leap second in the second information received thereafter will also be updated to the latest data. Therefore, because the second information is received again when the leap second is inserted, the current leap second information is also updated to the latest data, and the internal time can be set to the correct time.

Furthermore, because the specific date and time occur twice a year, such as on 7/1 and 1/1, increase in power consumption can also be suppressed.

Further preferably in a time adjustment device according to another aspect of the invention, the leap second information in the second information includes leap second insertion day and updated leap second information in addition to the current leap second information; the second information time adjustment means adjusts the internal time information using the current leap second information; and the third information time adjustment means adjusts the internal time information using the current leap second information if the internal time is before the leap second insertion day and time, and adjusts the internal time information using the updated leap second if the internal time is after the leap second insertion day and time.

This aspect of the invention receives the current leap second, the leap second insertion day, and the updated leap second values as the leap second information. The leap second insertion day and time are therefore automatically known once the leap second insertion day is determined because the leap second insertion time is always the last second of the update day. Because the leap second insertion time (update day and time) can be determined, the leap second used to adjust the time before and after the insertion time can be selected accordingly. The correct internal time can therefore be set automatically without receiving the second information again after the leap second is inserted.

Further preferably in a time adjustment device according to another aspect of the invention, the leap second information in the second information includes leap second insertion day and updated leap second information in addition to the current leap second information; the second information time adjustment means adjusts the internal time information using the current leap second information; and the third information time adjustment means adjusts the internal time information using the current leap second information if the internal time is before the leap second insertion day and time, adjusts the internal time information using the current leap second information if the internal time is after the leap second insertion day and time and the current leap second information and the updated leap second information are the same, and adjusts the internal time information using the updated leap second information if the internal time is after the leap second insertion day and time and the current leap second information and the updated leap second information are different.

This aspect of the invention also receives the current leap second, the leap second insertion day, and the updated leap second values as the leap second information. Because the leap second insertion time (update day and time) can be determined, the leap second used to adjust the time before and after the insertion time can be selected accordingly. The correct internal time can therefore be set automatically without receiving the second information again after the leap second is inserted.

In addition, if the current leap second and the updated leap second are the same, a leap second is not actually inserted, and the internal time can continue to be adjusted using the current leap second.

Further preferably in a time adjustment device according to another aspect of the invention, if the internal time information is within a specific period before a preset specific day and time, the time information adjustment unit determines if the second information was received in the specific period, and receives the second information if it was not received.

This specific period is a period of one month, three months, or six months before the specific day and time (which is the timing when there is a possibility that the leap second will be updated). Currently when a leap second is to be inserted, the leap second insertion day and updated leap second values of the seconds information are updated and broadcast as notification information approximately six months before the leap second is inserted.

This aspect of the invention sets this specific period within the time in which the leap second will be updated, and receives the second information once when the leap second insertion time is reached. Therefore, if the leap second information is updated, the latest information can be acquired after the data is updated, and the correct time can be set even when a leap second was inserted.

Further preferably in a time adjustment device according to another aspect of the invention, if the second information could not be received in the specific period, the time information adjustment unit sets the record in the storage unit of the internal time being adjusted by the second information to not-adjusted when the internal time reaches the preset specific day and time.

If the time adjustment device of the invention is, for example, put away inside a drawer during this specific period or otherwise located where GPS satellite signals are blocked and cannot be received, receiving the second information within the specific period may not be possible. If the second information was received before the specific period, the second information will not received again after the specific period has passed. As a result, if the leap second was inserted on the specific day, the correct time cannot be set later.

However, because the record of adjusting the internal time by the second information is set to not-adjusted in this aspect of the invention when the specific day and time are reached, the second information can be received again, the latest leap second information can be acquired, and the correct time can be set.

Another aspect of the invention is a timekeeping device with a time adjustment device, comprising the time adjustment device described above and a time display unit that displays the internal time information.

A timekeeping device with a time adjustment device according to this aspect of the invention can greatly reduce the average time of the reception process because it only receives third information, which can be received in a short time, to adjust the time after once adjusting the time by receiving the first information and second information.

This aspect of the invention is thus suited to mobile timekeeping devices such as wristwatches because power consumption can be reduced and the duration time of the timekeeping device can be increased. User convenience is also not impaired because the third information can be received in a short time. The invention is thus suited to mobile timekeeping devices such as wristwatches and pocket watches.

Another aspect of the invention is a time adjustment method including: a time information generating step that generates internal time information; a first information time adjustment step that receives first information including hour, minute, and second information, week information for the year, month, and day, and satellite health information in signals transmitted from positioning information satellites, and adjusts the internal time information based on the received first information; a second information time adjustment step that receives second information including leap second information in the satellite signal, and adjusts the internal time information based on the received second information; a third information time adjustment step that receives third information including hour, minute, and second information in the satellite signal, and adjusts the internal time information based on the received third information; a time adjustment recording step that records in a storage unit if the internal time information was adjusting using the first information, and if the internal time information was adjusting using the second information, after the internal time information was initialized; wherein the leap second information in the second information includes at least current leap second information, the first information time adjustment step executes if adjustment of the internal time information by the first information is not recorded in the storage unit, the second information time adjustment step executes if adjustment of the internal time information by the first information is recorded and adjustment by the second information is not recorded in the storage unit, and the third information time adjustment step executes if adjustment of the internal time information by the first information and second information is recorded in the storage unit.

This aspect of the invention has the same operational effect as the time adjustment device of the invention. Note that the content of claims 2 to 6 can also be applied by the time adjustment method of the invention.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 7 shows the timing of transmission of the second information in the GPS satellite signal.

DESCRIPTION OF EMBODIMENTS

A first embodiment of the invention is described below with reference to the accompanying figures.

Note that the following examples are specific preferred embodiments of the invention and describe technically desirable limitations, but the scope of the invention is not limited thereby unless such limitation is specifically stated below.

Figure 1:
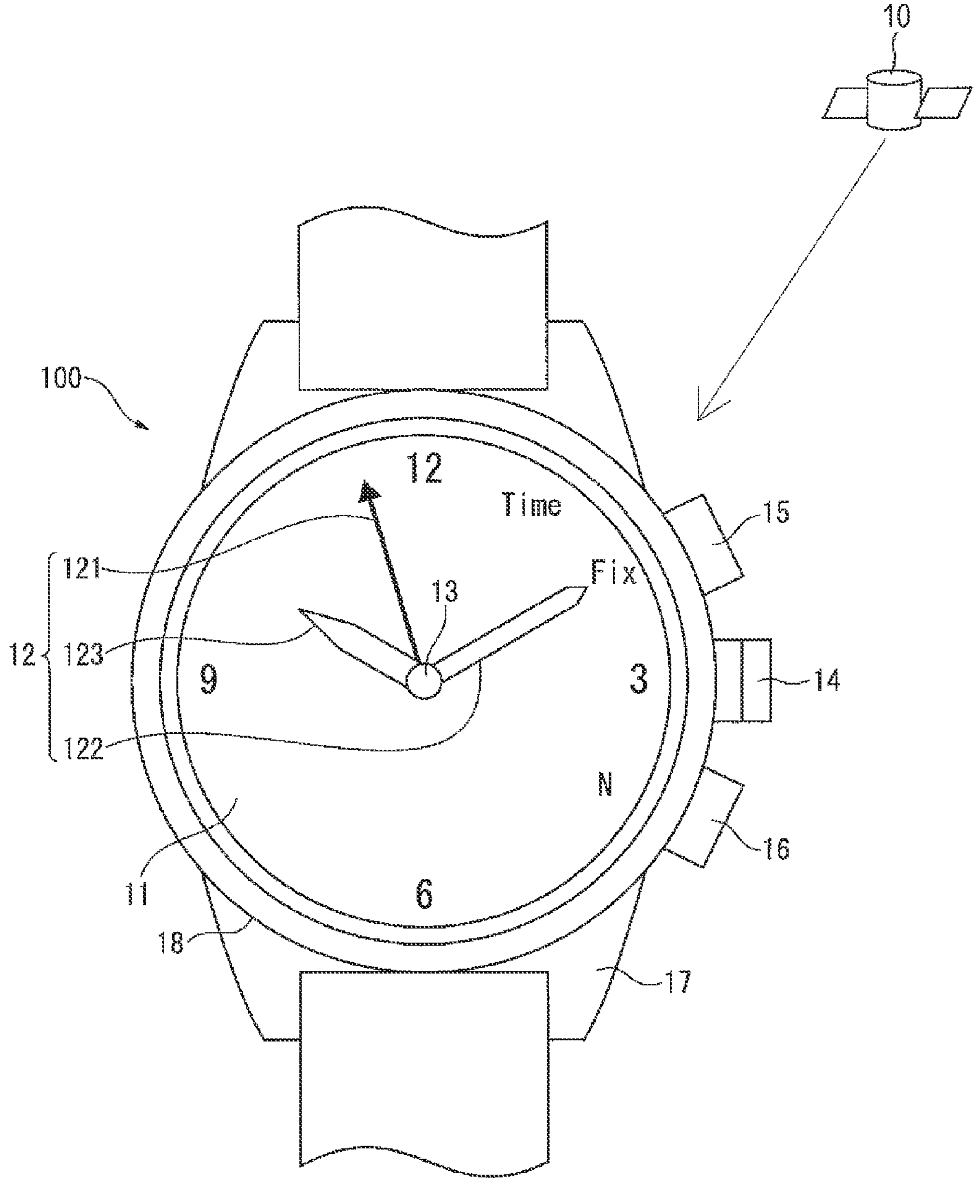
FIG. 1 is a plan view of a GPS wristwatch as an example of a time adjustment device according to the invention.
Figure 2:
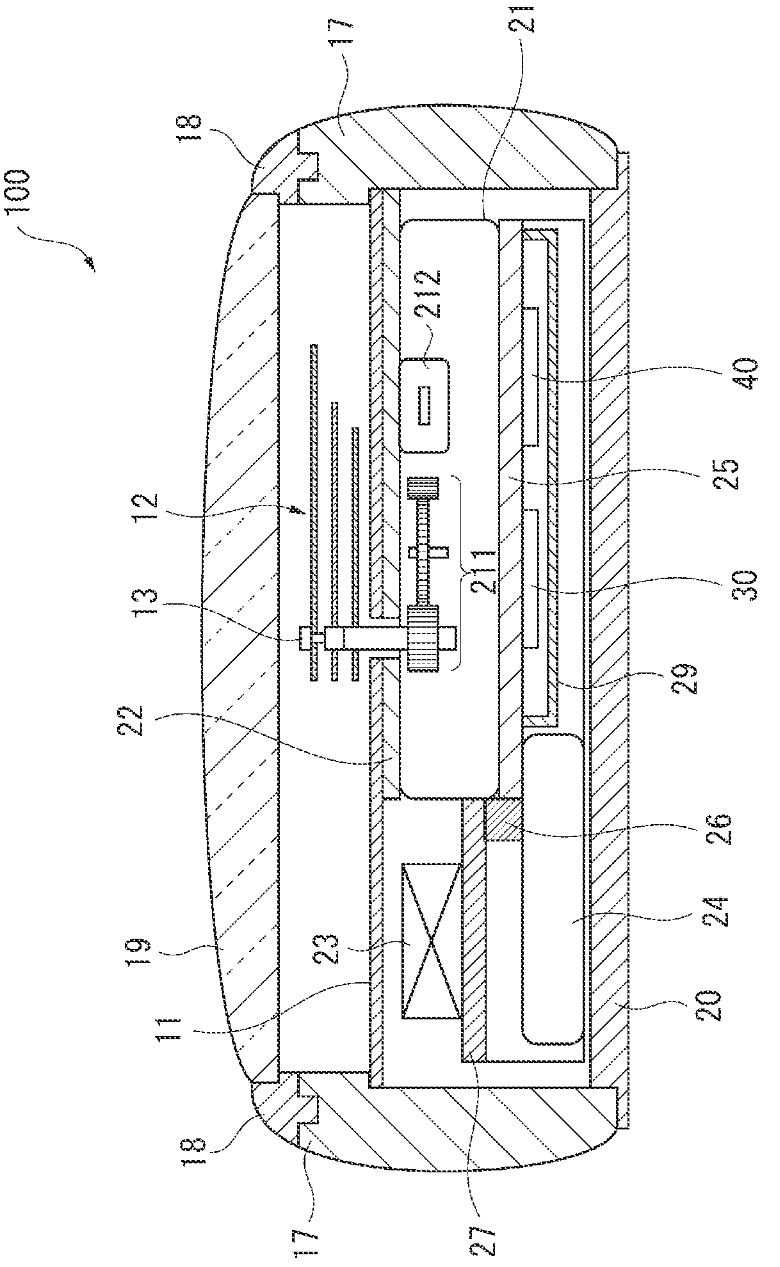
FIG. 2 is a section view of the GPS wristwatch.

FIG. 1 is a plan view of a GPS wristwatch 100 as a first embodiment of a timekeeping device with a time adjustment device according to the invention, and FIG. 2 is a section view of part of the GPS wristwatch 100.

As will be understood from FIG. 1, the GPS wristwatch 100 is a wristwatch (electronic timepiece) that is worn on the user's wrist, has a dial 11 and hands 12, and keeps and displays time on the face.

Most of the dial 11 is made from a non-metallic material (such as plastic or glass) through which light and microwaves in the 1.5 GHz band can pass easily.

The hands 12 are disposed on the face side of the dial 11. The hands 12 include a second hand 121, minute hand 122, and hour hand 123 that rotate on a center shaft 13, and are driven by a stepper motor through an intervening wheel train.

The GPS wristwatch 100 executes specific processes when the crown 14, button 15, and button 16 are manually operated. More specifically, when the crown 14 is operated, a time adjustment process that corrects the displayed time according to how the crown 14 is operated is performed. When the button 15 is depressed for an extended time (such as 3 or more seconds), a reception process for receiving satellite signals is performed.

When button 16 is pressed, a switching process for changing the reception mode (between a timekeeping mode and positioning mode) is performed. The second hand 121 jumps to the Time position (5-second position) when the timekeeping mode is selected, and the second hand 121 jumps to the Fix position (10-second position) when the positioning mode is set.

If the button 15 is pressed for a short time (such as less than 3 seconds), a display result process that displays the result of the previous reception process is performed. For example, the second hand 121 jumps to the Time position (the 5-second position) if reception was successful in the timekeeping mode, and the second hand 121 jumps to the Fix position (10-second position) if reception was successful in the positioning mode. If reception failed, the second hand 121 jumps to the N position (20-second position).

Note that the second hand 121 also moves to these positions during reception. The second hand 121 moves to the Time position (the 5-second position) during reception in the timekeeping mode, and the second hand 121 moves to the Fix position (10-second position) during reception in the positioning mode. If a GPS satellite 10 cannot be tracked, the second hand 121 moves to the N position (20-second position).

As shown in FIG. 2, the GPS wristwatch 100 has an outside case 17 that is made of stainless steel, titanium, or other metal. The outside case 17 is basically cylindrically shaped. A crystal 19 is attached to the opening on the face side of the outside case 17 by an intervening bezel 18. The bezel 18 is made from a non-metallic material such as ceramic in order to improve satellite signal reception performance. A back cover 20 is attached to the opening on the back side of the outside case 17. Inside the outside case 17 are disposed a movement 21, a solar cell 22, a GPS antenna 23, and a storage battery 24.

The movement 21 includes a stepper motor and wheel train 211. The stepper motor has a motor coil 212, a stator and a rotor, and drives the hands 12 through the wheel train 211 and rotating center shaft 13.

A circuit board 25 is disposed on the back cover 20 side of the movement 21. The circuit board 25 is connected through a connector to an antenna circuit board 27 and the storage battery 24.

A GPS reception circuit 30 including a reception circuit for processing satellite signals received through the GPS antenna 23, and a control circuit 40 that controls driving the stepper motor, for example, are mounted on the circuit board 25. The GPS reception circuit 30 and control circuit 40 are covered by a shield plate 30, and are driven by power supplied from the storage battery 24.

The solar cell 22 is a photovoltaic device that converts light energy to electrical energy and outputs power. The solar cell 22 has an electrode for outputting the produced power, and is disposed on the back cover side of the dial 11. Most of the dial 11 is made from a material that easily passes light, and the solar cell 22 receives and converts light passing through the crystal 19 and dial 11 to electrical power.

The storage battery 24 is the power supply for the GPS wristwatch 100, and stores power produced by the solar cell 22. The two electrodes of the solar cell 22 and the two electrodes of the storage battery 24 can be electrically connected in the GPS wristwatch 100, and the storage battery 24 is charged by the photovoltaic power generation of the solar cell 22 when thus electrically connected. Note that this embodiment of the invention uses a lithium ion battery, which is well suited to mobile devices, as the storage battery 24, but the invention is not so limited and lithium polymer batteries or other types of storage batteries, or a storage device other than a storage battery (such as a capacitive device), may be used instead.

The GPS antenna 23 is an antenna that can receive microwaves in the 1.5 GHz band, and is mounted on the antenna circuit board 27 located on the back cover 20 side of the dial 11. The part of the dial 11 overlapping the GPS antenna 23 in the direction perpendicular to the dial 11 is made from a material through which 1.5-GHz microwave signals pass easily (such as a non-metallic material with low conductivity and low magnetic permeability). The solar cell 22 with electrodes does not intervene between the GPS antenna 23 and the dial 11. The GPS antenna 23 can therefore receive satellite signals passing through the crystal 19 and the dial 11.

As the distance between the GPS antenna 23 and the solar cell 22 decreases, loss can result due to electrical connection between metal components of the GPS antenna 23 and the solar cell 22, resulting in the radiation pattern of the GPS antenna 23 being blocked by the solar cell 22 becoming smaller. The GPS antenna 23 and solar cell 22 are therefore disposed with at least a specific distance therebetween in this embodiment of the invention to prevent a drop in reception performance.

The GPS antenna 23 is also disposed with at least a specific distance to metal parts other than the solar cell 22. For example, if the outside case 17 and movement 21 contain metal parts, the GPS antenna 23 is disposed so that the distance to the outside case 17 and the distance to the movement 21 is at least this specific distance. Note that a patch antenna (microstrip antenna), helical antenna, chip antenna, or inverted F-type antenna, for example, could be used as the GPS antenna 23.

The GPS reception circuit 30 is a load that is driven by power stored in the storage battery 24, attempts to receive satellite signals from the GPS satellites 10 through the GPS antenna 23 each time the GPS reception circuit 30 is driven, supplies the acquired orbit information, GPS time information, and other information to the control circuit 40 when reception succeeds, and sends a failure report to the control circuit 40 when reception fails.

Figure 3:
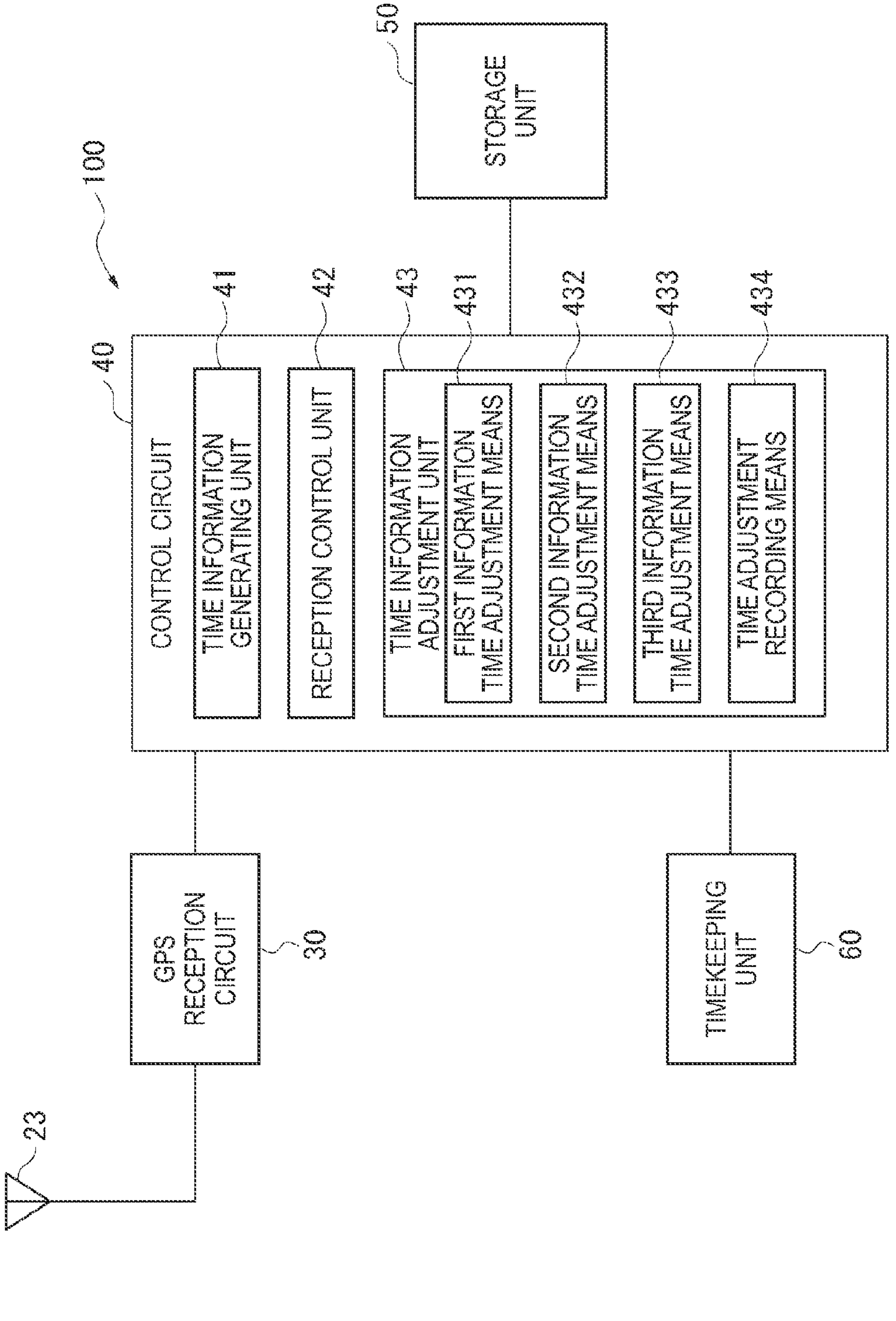
FIG. 3 is a block diagram showing the circuit configuration of the GPS wristwatch.

FIG. 3 is a block diagram showing the circuit configuration of the GPS wristwatch 100. As shown in this figure, the GPS wristwatch 100 has a GPS antenna 23, GPS reception circuit 30, control circuit 40, storage unit 50, and timekeeping unit 60.

While not shown in the figures, the main parts of the GPS reception circuit 30 include an RF (radio frequency) unit and GPS signal processor. The RF unit and GPS signal processor perform a process that acquires orbit information and satellite information such as the GPS time contained in the navigation message decoded from a 1.5 GHz satellite signal.

The RF unit is a common component of a GPS receiver having a down-converter that converts high frequency signals to intermediate frequency band signals, and an A/D converter that converts these IF band analog signals to digital signals.

The GPS signal processor includes a DSP (digital signal processor), CPU (central processing unit), SRAM (static random access memory), and RTC (real-time clock), and runs a process that demodulates the navigation message from the digital signal (IF signal) output from the RF unit, and acquires satellite information such as the GPS time and orbit information contained in the navigation message.

The GPS antenna 23 and GPS reception circuit 30 in this embodiment of the invention thus render a reception unit that receives satellite signals transmitted from GPS satellites 10.

Navigation Message

The format of a navigation message is described next with reference to FIG. 4A to FIG. 4C.

Figure 4A:
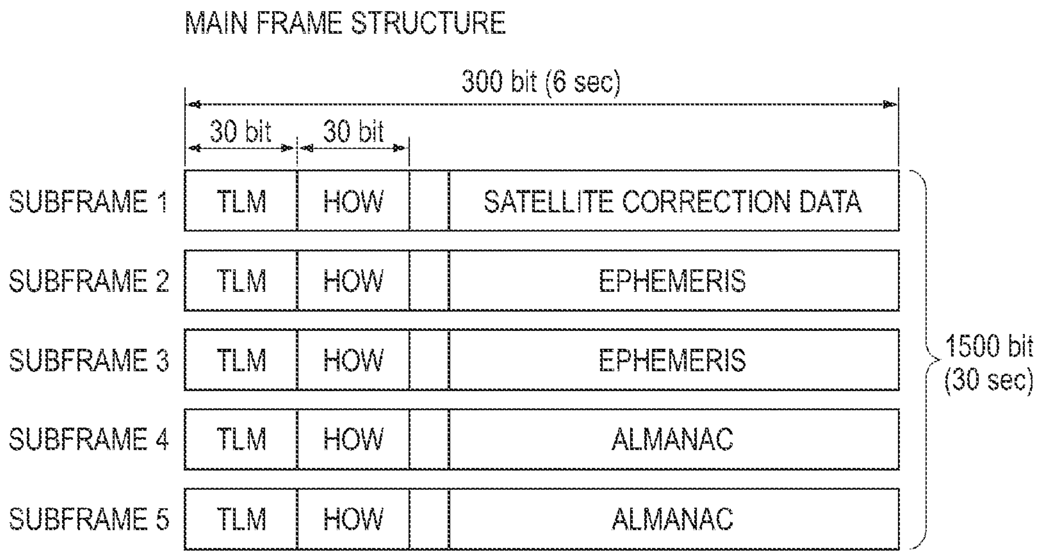
FIG. 4 shows the format of a GPS satellite signal.

As shown in FIG. 4A, a navigation message is composed of 1500 bits in one main frame. One main frame is divided into five subframes 1 to 5 of 300 bits each. One subframe of data is transmitted in 6 seconds from each GPS satellite 10. It therefore takes 30 seconds to send the data in one main frame from each GPS satellite 10.

Subframe 1 contains satellite correction data including week number data and SV health information. The week number identifies the week of the current GPS time information. More specifically, GPS time started at 00:00:00 on Jan. 6, 1980 in UTC, and the week number of the week that started that day is week number 0. The week number is updated every week.

The SV health information is a code indicating satellite errors, and this code can be used to prevent using signals transmitted from satellites in which there is an error.

Because subframes 1 to 3 in each set of five subframes contains information specific to a particular satellite, the same content is repeated during every transmission. More specifically, subframes 1 to 3 contain clock correction data and orbit information (ephemeris) specific to the transmitting satellite. Subframes 4 and 5, however, contain orbit information for all satellites (almanac data) and ionospheric correction information, which are stored in subframes 4 and 5 over multiple pages because of the large amount of information.

More specifically, the data carried in subframes 4 and 5 is divided over pages 1 to 25, and different page content is sequentially transmitted in each frame. Because 25 frames are required to transmit the content of all pages, 12 minutes 30 seconds are required to receive all of the information in the navigation message.

Each of subframes 1 to 5 starts with a telemetry (TLM) word storing 30 bits of telemetry data followed by a HOW word (handover word) storing 30 bits of handover data.

Therefore, while the TLM and HOW words are transmitted at 6-second intervals from the GPS satellites 10, the week number data and other satellite correction data, ephemeris, and almanac data are transmitted at 30-second intervals.

Figure 4B:
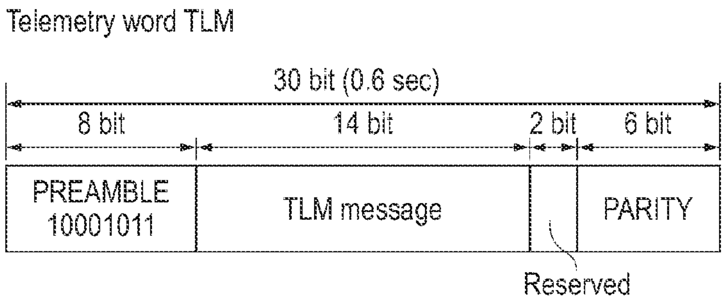

As shown in FIG. 4B, the TLM word contains a preamble, a TLM message and reserved bits, and parity data.

Figure 4C:
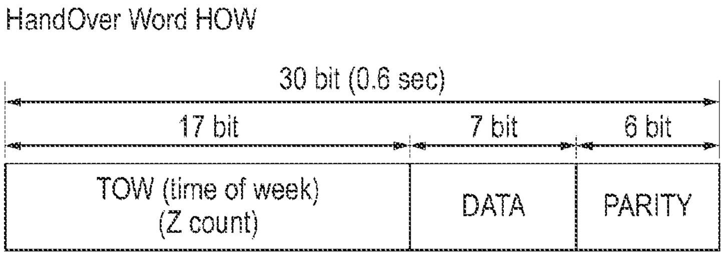

As shown in FIG. 4C, the HOW word contains GPS time information called the TOW or Time of Week (also called the Z count). The Z count denotes in seconds the time passed since 00:00 of Sunday each week, and is reset to 0 at 00:00 Sunday the next week. More specifically, the Z count denotes the time passed from the beginning of each week in seconds. The Z count denotes the GPS time at which the first bit of the next subframe data is transmitted. For example, the Z count transmitted in subframe 1 denotes the GPS time that the first bit in subframe 2 is transmitted.

The HOW word also contains 3 bits of data denoting the subframe ID (ID code). More specifically, the HOW words of subframes 1 to 5 shown in FIG. 4A contain the ID codes 001, 010, 011, 100, and 101, respectively.

As described above, week number (WN) and satellite health information (SV health) are stored in subframe 1. First information can therefore be acquired by receiving subframe 1.

Leap second information is contained in page 18 of subframe 4. The current leap second, the leap second insertion week and leap second insertion day identifying the day the leap second value is updated, and the updated leap second (the leap second after it is updated), are contained in the leap second information, and this information is stored at bits 241 to 278 in page 18 of subframe 4. The leap second insertion week, leap second insertion day, and the updated leap second values contained in the leap second information are not stored as data until it is determined that a leap second must be inserted, but once it is determined that a leap second will be inserted, these values are broadcast from approximately six months before the leap second is inserted.

The second information including the Z count (hour, minute, second) and leap second information can therefore be acquired by receiving page 18 of subframe 4.

The time information (Z count) is stored in all subframes, and can therefore be received as the third information every 6 seconds.

This means that when the calendar has not been set, such as after a system reset, subframe 1 transmitted every 30 seconds must be received, the first information (week number and SV health information) acquired, and the year, month, and day information determined.

In order to calculate UTC from GPS time, which can be calculated from the week number and Z count, subframe 4 on page 18 transmitted every 12.5 minutes must be received, the second information acquired, and the current leap second information acquired.

After the first information and second information have been acquired, the passage of time from when the week number was received can be counted, and the current week number of the GPS satellite 10 can be known from the acquired week number and elapsed time without receiving the week number again. The current GPS time can therefore be acquired and adjusted using the current leap second information by acquiring only the third information (Z count), and UTC can be determined.

The reception operation of the receiver can therefore be completed in a short time and low power consumption can be achieved with a configuration that acquires only the third information after acquiring the first information and second information.

Control Circuit

The control circuit 40 is rendered with a CPU for controlling the GPS wristwatch 100. As described below, the control circuit 40 controls the GPS reception circuit 30 and executes a reception process. The control circuit 40 also controls operation of the timekeeping unit 60.

As shown in FIG. 3, the control circuit 40 has a time information generating unit 41, reception control unit 42, and time information adjustment unit 43.

The time information adjustment unit 43 includes a first information time adjustment means 431, second information time adjustment means 432, third information time adjustment means 433, and time adjustment recording means 434.

These components of the control circuit 40 are described in further detail below.

Storage Unit Configuration

The storage unit 50 stores time data (satellite time information) obtained by the GPS reception circuit 30.

Figure 5:
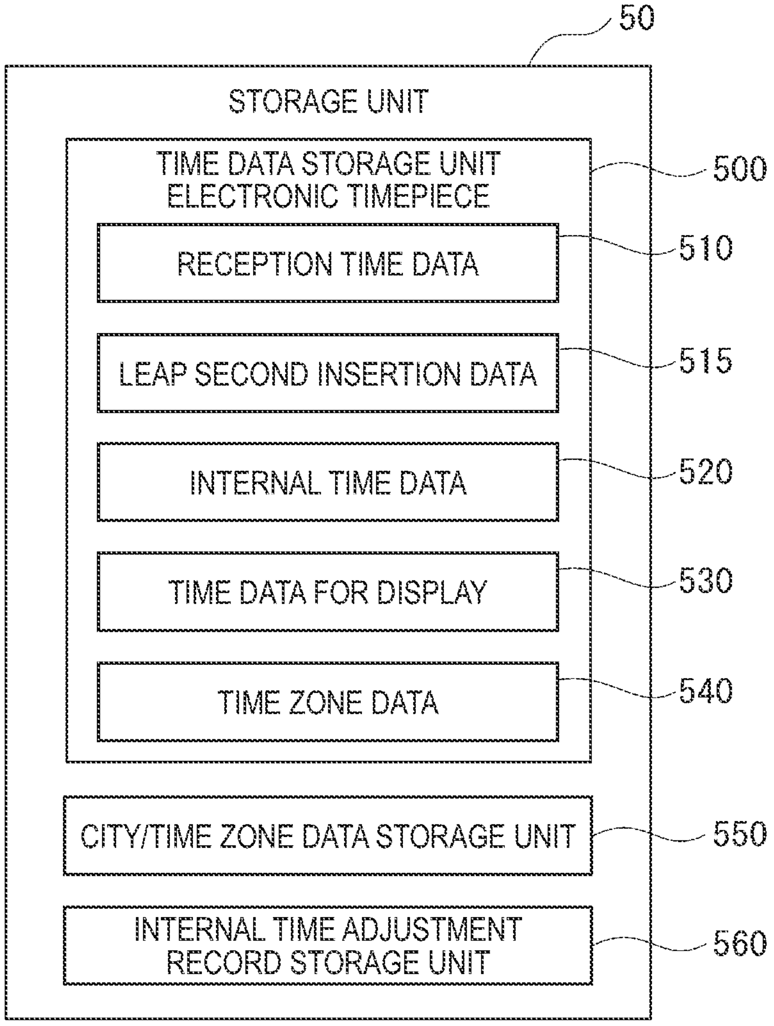
FIG. 5 is a block diagram showing the configuration of the storage unit of the GPS wristwatch.

More specifically, the storage unit 50 has a time data storage unit electronic timepiece 500, city/time zone data storage unit 550, and internal time adjustment record storage unit 560 as shown in FIG. 5.

The time data storage unit electronic timepiece 500 stores reception time data 510, leap second insertion data 515, internal time data 520, time data for display 530, and time zone data 540.

Satellite time information (GPS time) acquired from a satellite signal is stored in the reception time data 510. This reception time data is normally updated based on a reference signal generated by the time information generating unit 41, and is adjusted according to the acquired satellite time information (GPS time) when a satellite signal is received.

At least the current leap second data is stored in the leap second insertion data 515. More specifically, leap second related information contained in subframe 4 of page 18 of the satellite signal includes the current leap second, leap second insertion week, leap second insertion day, and the updated leap second. Of these values, at least the current leap second is stored in the leap second insertion data 515.

Internal time is stored in the internal time data 520. The internal time is updated based on the GPS time stored in the reception time data 510, and the current leap second stored in the leap second insertion data 515. UTC is thus stored as the internal time data 520. This internal time information is also updated when the reception time data 510 is updated by the reference signal generated by the time information generating unit 41.

The time obtained by applying the time zone information stored in the time zone data 540 to the internal time information in the internal time data 520 is stored as the time data for display 530. The time zone data 540 stores the set time zone.

The city/time zone data storage unit 550 stores time zone data for individual cities with the time zone data related to the city names. More specifically, when the user selects the name of a city to find the current time in that city, the control circuit 40 searches the city/time zone data storage unit 550 for the name of the city selected by the user, and acquires the time zone of that city. For example, because JST is nine hours ahead of UTC (UTC+9), +9 hours is stored in the time zone data 540 when Tokyo is selected.

The internal time adjustment record storage unit 560 stores a first information adjustment record that indicates if the satellite time information in the reception time data 510 and the internal time information that is stored in the internal time data 520 and updated in conjunction with the reception time data 510 were adjusted using the first information, and a second information adjustment record that indicates if this information was adjusted using the second information.

Detailed Configuration of the Control Circuit

The configuration of the control circuit 40 is described in detail next.

The time information generating unit 41 counts a reference signal generated by a crystal oscillator or oscillation circuit not shown, and updates the reception time data 510 and internal time data 520.

The reception control unit 42 controls the GPS reception circuit 30 and runs the GPS signal reception process.

The time information adjustment unit 43 adjusts the reception time data 510 and internal time data 520 based on the time information in the received GPS signal, and includes a first information time adjustment means 431, second information time adjustment means 432, third information time adjustment means 433, and time adjustment recording means 434.

The first information time adjustment means 431 controls the GPS reception circuit 30 in a first reception mode through the reception control unit 42, receives the first information (Z count, week number, SV health) contained in subframe 1 of the GPS signal, and adjusts the reception time data 510 using this first information. The internal time data 520 is also adjusted at the same time using the reception time data 510 and the current leap second value in the leap second insertion data 515.

The second information time adjustment means 432 controls the GPS reception circuit 30 in a second reception mode through the reception control unit 42, receives the second information (Z count and current leap second information) contained in subframe 4, page 18 of the GPS signal, and updates the hour, minute, second of the reception time data 510 using the received Z count, and the leap second insertion data 515 to the current leap second information. The internal time data 520 is also adjusted at the same time using the reception time data 510 and current leap second information in the leap second insertion data 515.

The third information time adjustment means 433 controls the GPS reception circuit 30 in a third reception mode through the reception control unit 42, receives the third information (Z count) contained in the GPS signal, and adjusts the hour, minute, second of the reception time data 510. The internal time data 520 is also adjusted at the same time using the reception time data 510 and current leap second information in the leap second insertion data 515.

The time adjustment recording means 434 stores a first information adjustment record and a second information adjustment record in the internal time adjustment record storage unit 560 of the storage unit 50. The first information adjustment record indicates if the reception time data 510 and internal time data 520 were adjusted by the first information after a system reset of the GPS wristwatch 100, such as when the power turns on after the battery is replaced. The second information adjustment record indicates if the reception time data 510 and internal time data 520 were adjusted using the second information.

The timekeeping unit 60 includes the hands 12 and movement 21, and drives the hands 12 to indicate the time of the time data for display 530.

Time Adjustment Process

The operation of the GPS wristwatch 100 is described next with reference to the flow chart in FIG. 6. This first embodiment of the invention adjusts the time using the current leap second data as the second information.

The GPS wristwatch 100 enables selecting by means of a control signal from the control circuit 40 an automatic adjustment mode that regularly automatically receives satellite signals sent from GPS satellites 10 and adjusts the time, or a non-adjustment mode in which such automatic adjustment does not occur. These modes can be manually selected by operating the crown 14 or buttons 15, 16 disposed to the GPS wristwatch 100.

The GPS wristwatch 100 can also operate in a manual adjustment mode (forced adjustment mode) that can be selected by operating the crown 14 or buttons 15, 16 to force receiving satellite signals and adjusting the time.

Figure 6:
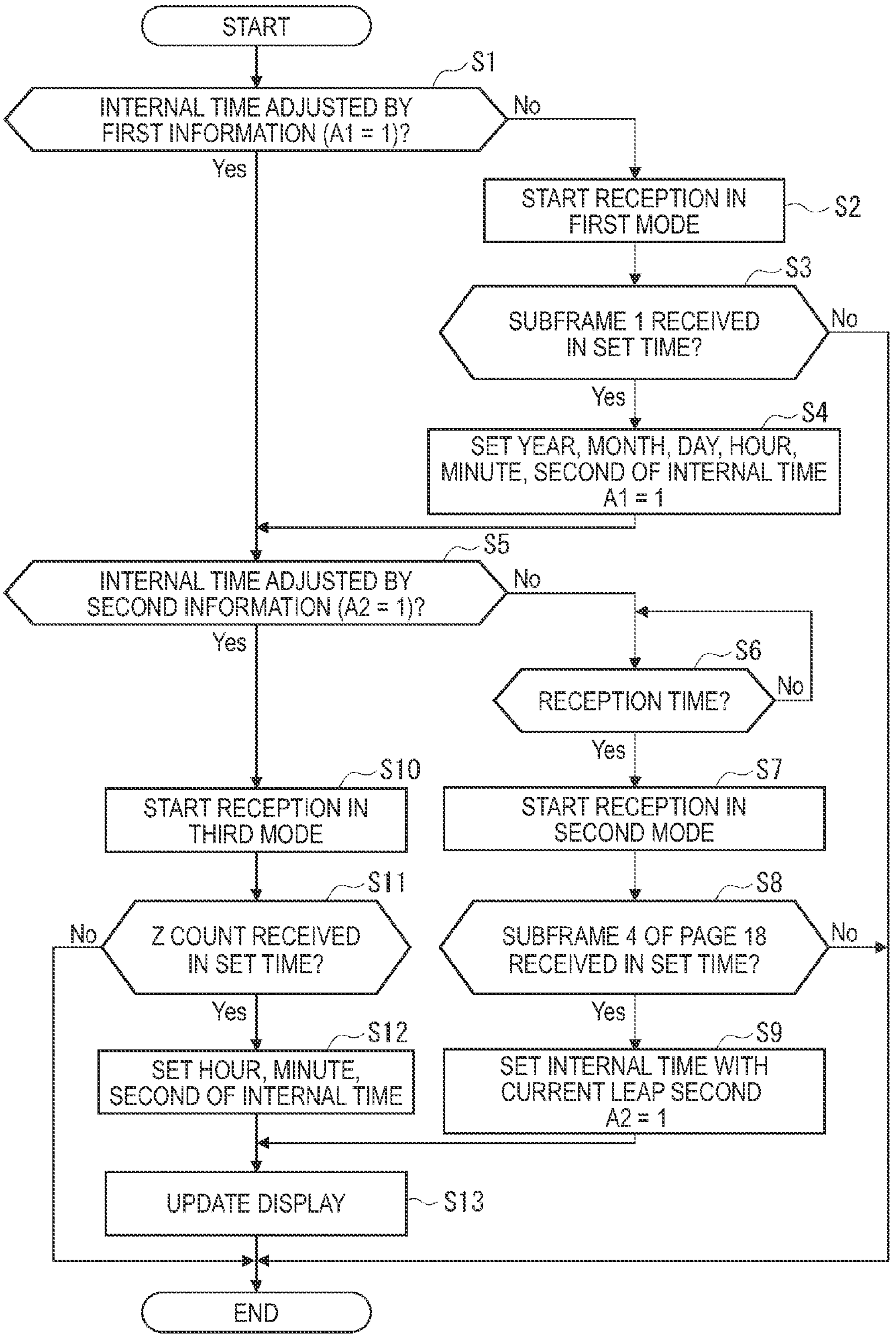
FIG. 6 is a flow chart showing the reception process of a first embodiment of the invention.

When the automatic adjustment mode is set, the GPS wristwatch 100 runs the time adjustment process shown in FIG. 6 when a specific reception time (reception timing) is reached.

The GPS wristwatch 100 also runs the time adjustment process shown in FIG. 6 when the reception process is forced in the manual mode.

The reception time in the automatic adjustment mode is set referenced to a time such as described below. If the accuracy of the GPS wristwatch 100 is, for example, approximately 0.5 second/day maximum, one time a day is sufficient as the number of times a satellite signal is received from a GPS satellite 10 to adjust the time. The GPS wristwatch 100 therefore preferably runs the reception process at a time during the day when the GPS wristwatch 100 is in an environment where satellite signals sent from the GPS satellites 10 can be easily received. The reception time is therefore set based on the time of this easy reception environment.

The reception time could be set to 2:00 or 3:00 in the morning, or 7:00 or 8:00 in the morning.

Setting the reception time to 2:00 or 3:00 in the morning is useful because the GPS wristwatch 100 likely not being used by the user and is left stationary indoors, few electrical devices are being used, and the radio reception environment is probably best.

Setting the reception time to 7:00 or 8:00 in the morning is useful because this is typical commuting time when the user is wearing the GPS wristwatch 100 and the GPS wristwatch 100 is probably being used outdoors. More specifically, even if the user works in an office building or factor where satellite signals often do not reach, the likelihood that the user is outside while commuting is high, the likelihood that satellite signals can be received is accordingly high, and the radio reception environment is good.

When the time adjustment process starts, the time information adjustment unit 43 of the control circuit 40 first references the internal time adjustment record storage unit 560 and determines if subframe 1 was previously received and the time was adjusted using the first information (year, month, day, hour, minute, second, and SV health) contained in subframe 1 (S1).

S1 returns No if the internal time has not once been set using the first information after a system reset such as when the battery is replaced. In this case, the time information adjustment unit 43 drives the first information time adjustment means 431, controls the GPS reception circuit 30 through the reception control unit 42 in the first mode, and runs the reception process (S2).

Next, the first information time adjustment means 431 determines if subframe 1 was received within a preset time (S3).

The first information time adjustment means 431 determines that subframe 1 was received if any of the following three conditions are true.

Condition 1 is that signals were received from plural satellites and the year, month, day, hour, minute, second values in the received signals match. This is because if the same time data is received from plural satellite signals, it can be determined that correct time data was received.

Condition 2 is that the Z count (hour, minute, second) was received plural times from one satellite, and the received Z count values are within a specified range. More specifically, because the Z count is transmitted every 6 seconds, it can be determined that correct time data was received if the hour, minute, second values of the plural Z counts received continuously from one satellite are 6 seconds apart.

Condition 3 is that a signal was received from a satellite that is healthy as indicated by the SV health information in subframe 1. The SV health information tells the receiver if the GPS satellite 10 is currently operating normally, and if the signal was received from a healthy satellite, it can be determined that correct time data was received.

If subframe 1 could not be received in the set time, the first information time adjustment means 431 determines that a satellite signal cannot be received and ends the current reception process.

This set time is long enough to enable evaluating the foregoing conditions, and is set to 1 to 3 seconds, for example. More specifically, because subframe 1 is transmitted every 30 seconds, reception for a time enabling acquiring at least one subframe 1 is sufficient to evaluate condition 1 and condition 3. Furthermore, because the Z count is transmitted every 6 seconds, receiving signals for 30 seconds to 1 minute is sufficient to receive plural Z counts.

If the reception process continues for the set time but none of the conditions is satisfied and it is determined that a signal could not be received, the first information time adjustment means 431 returns No in S3 and ends this current reception process.

If S3 returns Yes, the first information time adjustment means 431 updates the reception time data 510 using the first information (year, month, day, hour, minute, second) from the received subframe 1, and also adjusts the internal time data 520 (S4).

To record that the internal time was corrected using the first information, the time adjustment recording means 434 sets a flag A1 stored in the internal time adjustment record storage unit 560 to 1 (S4). This flag A1 is a first information adjustment record, and in step S1 the time information adjustment unit 43 determines if the internal time was previously adjusted based on the first information based on if flag A1 is set to 1.

If S1 returns Yes or if step S4 executes, that is, if the internal time was adjusted using the first information either in a previous reception process or the current reception process, the time information adjustment unit 43 determines if the time was previously adjusted by receiving the second information (Z count and current leap second information) (S5). A flag A2 stored in the internal time adjustment record storage unit 560 is the second information adjustment record, and if the internal time was corrected in the past based on the second information, flag A2 is set to 1. Based on whether or not the flag A2 is set to 1, the time information adjustment unit 43 can therefore determine in S5 if the internal time was previously adjusted based on the second information.

If the internal time has not once been adjusted based on the second information after a system reset, flag A2 is set to 0, and S5 returns No. In this case, the time information adjustment unit 43 drives the second information time adjustment means 432 to control the GPS reception circuit 30 through the reception control unit 42 in the second mode and run the reception process.

The second information time adjustment means 432 first determines if the reception time has come (S6). This reception time is the time when the data for subframe 4 of page 18 containing the leap second information is transmitted. This time can be determined as follows.

GPS time is managed in one-week units, and the Z count is the time passed since the beginning of the week (00:00:00 Sunday). Subframes 1 to 5 are repeatedly transmitted sequentially from the beginning of the week, and subframe 4 and subframe 5 are transmitted sequentially on pages 1 to 25. This means that the data on subframe 4 of page 18 is subframe 89 counting from the beginning of the week, and is transmitted at known times as shown in FIG. 7. The time when each subsequent subframe 4 of page 18 is transmitted can also be determined based on the time from the beginning of the week. The leap second information can therefore be received by running the reception process when the GPS time stored as the reception time data 510 reaches the transmission time shown in FIG. 7. Considering the time also needed from the start of the reception process to find and synchronize with a satellite, the reception process preferably starts approximately 20 seconds before the appropriate transmission time.

If the second information is received immediately after the first information is received in S2 to S4, the leap second transmission time can also be accurately determined when the first information is received, and the reception time can also be set accurately.

Note that if Yes is returned in S1, the reception process has yet to run, and the internal time data 520 of the GPS wristwatch 100 is incorrect, receiving the leap second information at the above times may not be possible. However, because the next leap second transmission time can be known once the Z count is received, reception can be repeated at that time. More specifically, the Z count reception process can be run between S5 and S6 to get the leap second reception time.

If S6 returns Yes and the reception time has come, the second information time adjustment means 432 controls the GPS reception circuit 30 in the second mode and starts reception (S7).

The second information time adjustment means 432 then determines if subframe 4 of page 18 was received in the set time (S8). This set time is sufficient to receive the data in subframe 4 of page 18, such as 30 seconds to 1 minute. Note that whether subframe 4 of page 18 was actually received can be determined from the value of the Z count in the received subframe or the page ID in the subframe.

If No is returned in S8, the second information time adjustment means 432 ends the current reception process.

If Yes is returned in S8, the second information time adjustment means 432 adjusts the internal time using the received current leap second (S9). The second information time adjustment means 432 also stores the received current leap second data in the leap second insertion data 515.

The time adjustment recording means 434 also sets the flag A2 stored in the internal time adjustment record storage unit 560 to 1 to record that the internal time was adjusted using the second information.

Note that the current leap second value is added to the internal time data 520 in S9 to correct the time for leap seconds, but because the Z count (hour, minute, second) is also contained in the second information, the reception time data 510 could be updated using the hour, minute, second in the second information, and the internal time data 520 could be adjusted using the GPS time of the reception time data 510 and the current leap second value.

In addition, when the first mode is used for reception in S2, the second information (subframe 4 of page 18) containing the leap second information could be received before the first information (subframe 1) is received depending on the satellite signal transmission timing. Because the second information can also be acquired at the same time in this case, correction using the current leap second information could also be applied when adjusting the internal time in S4. Because the time has already been adjusted using the second information in this case and reception in the second mode is not necessary, flag A2 may also be set to 1 so that Yes is returned in S5. Because the time has just been adjusted using the first and second information, the displayed time can be updated in S13 without performing S10 to S12.

However, if S5 returns Yes, that is, the internal time has been adjusted using the first information and second information, the time information adjustment unit 43 operates the third information time adjustment means 433. The third information time adjustment means 433 controls the GPS reception circuit 30 through the reception control unit 42 in the third mode, and starts reception (S10).

The third information time adjustment means 433 then determines if the third information, that is, the Z count, is received within a set time (S11). This set time is also set to a time such as 30 seconds that is sufficient for receiving Z count data, which is transmitted every 6 seconds.

If S1 returns No, the third information time adjustment means 433 ends the current reception process.

If S11 returns Yes, the third information time adjustment means 433 updates the reception time data 510 using the received Z count (hour, minute, second), and also updates the internal time information stored in the internal time data 520 using the received GPS time and the current leap second received in the second mode and stored in the leap second insertion data 515 (S12). Note that the time adjustment process of S12 and the display updating process of S13 are preferably performed only when the difference between the received Z count (hour, minute, second) and the GPS time of the reception time data 510 updated at the reference signal is within a specific time (such as 1 minute). This is because the received Z count maybe wrong if the difference between the received Z count and the reception time data 510 is greater than this specific time. The time displayed by the hands is not adjusted in this case, but if the displayed time is off greatly, the user should manually start the reception process, and if the displayed time is not off greatly, the display can be updated the next time GPS signals are received, and there is no real problem for everyday use.

The time data for display 530 is then corrected based on the time zone data 540 and the internal time data 520 corrected in S9 or S12, the hands 12 are moved based on the time data for display 530, and the displayed time is updated (S13).

As described above, the reception process ends when the display is updated in S13, and when data reception fails in S3, S8, or S11.

The effect of this first embodiment of the invention is described next.

(1) Because the operations of S1 to S4 are performed when the time has not been adjusted using the first information after a system reset, that is, the first time reception is attempted after a system reset, subframe 1 can be received and the year, month, day, hour, minute, second of the internally kept time can be set.

The correct time can therefore be reliably set after a system reset when the likelihood is high that the internal clock is off because the year, month, and day identified by the week number is received in addition to the hour, minute, and second identified by the Z count, and the internal time can be set based on complete time information.

In addition, because the second information (the hour, minute, second and leap second value contained in subframe 4 of page 18) is additionally received and the internal time information is adjusted accordingly, the internal time can also be set to the accurate time accounting for leap seconds.

(2) Before receiving GPS signals to adjust the time, the GPS wristwatch 100 first checks if the time was previously set using the first information and second information, and receives only the Z count (third information) if the time was previously set using the second information. If the difference between the time indicated by the received Z count and the and the reception time data 510 is less than or equal to a specific threshold value (internal time tolerance range), the reception time data 510 is adjusted based on the received Z count.

As a result, the first information (subframe 1) is received when the time was not previously set using the first information (when S1 returns No), and the second information (subframe 4 of page 18) is received only when the time was not previously set using the second information (when S5 returns No).

Considering the precision of quartz timepieces, the difference per day between the actual time and the internal time is less than 1 second. As a result, receiving the Z count alone is sufficient when normally adjusting the time by executing the reception process in FIG. 6 once daily, and the internal time can be adjusted to the correct time by a short reception process. As a result, power consumption can be reduced when adjusting the time regularly such as once a day.

Reception performance also improves if the GPS wristwatch 100 is stationary while receiving the GPS signals. However, needing to leave the GPS wristwatch 100 stationary for an extended time is inconvenient for the user. However, because a short reception process that receives only the Z count is normally sufficient in this embodiment of the invention, the time that the timepiece needs to be held stationary can be shortened and user convenience can be improved.

(3) If the time is set once using the first information and second information after a system reset, the time can be subsequently adjusted by receiving only the third information (Z count). As a result, the length of the reception process can be shortened compared with when both the first information and second information are always received, and total power consumption by the GPS wristwatch 100 can be reduced.

As a result, the duration time of a battery-powered GPS wristwatch 100 can be increased compared with a configuration in which subframe 1, for example, is always received as in the related art, and user convenience can be improved.

(4) The first information time adjustment means 431 can determine if the GPS satellite 10 being tracked is currently healthy because the first information including SV health information is received. Setting the wrong time as a result of receiving signals from GPS satellites 10 that are not healthy can therefore be prevented when adjusting the internal time information using the first information.

Embodiment 2

A second embodiment of the invention is described next with reference to accompanying figures.

Figure 8:
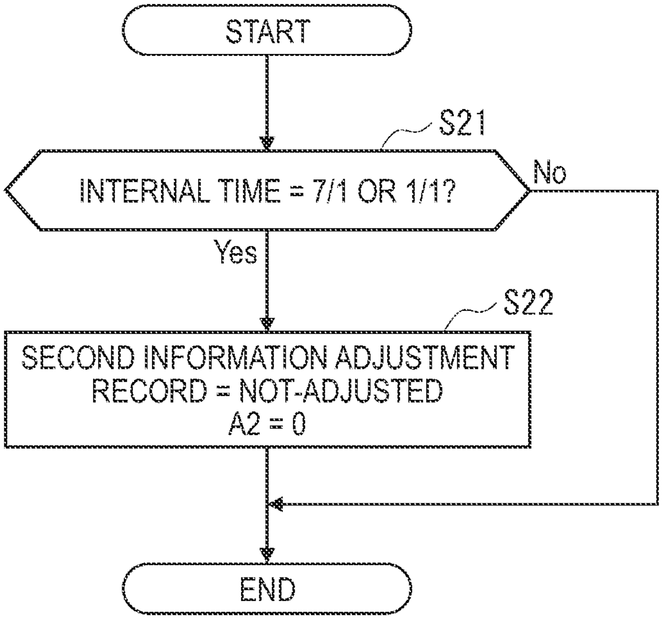
FIG. 8 is a flow chart of the specific day checking process in a second embodiment of the invention.

This second embodiment differs only by the addition of a specific day checking process as shown in FIG. 8 before the reception process (the process shown in FIG. 6) of the first embodiment. This difference is described below.

In the second embodiment of the invention the time information adjustment unit 43 runs the process shown in FIG. 8 once a day. The process shown in FIG. 8 must be executed before the automatic or manual reception process is performed that day. The time information adjustment unit 43 may therefore run the process shown in FIG. 8 immediately after the date changes, or immediately before the first reception process of the day is performed.

When the specific day checking process in FIG. 8 is run, the time information adjustment unit 43 first checks the internal time data 520, which is set to UTC, and determines if the day is 7/1 or 1/1 (S21). If S21 returns No, the specific day checking process in FIG. 8 ends without doing anything else.

However, if S21 returns Yes, the time adjustment recording means 434 sets the flag A2 to 0 (S22). More specifically, the second information adjustment record is set to not-adjusted (A2=0) even if the internal time was previously adjusted using the second information.

After ending the process in FIG. 8, the time information adjustment unit 43 proceeds to the process shown in FIG. 6.

As a result, steps S6 to S9 execute if the reception day is 7/1 or 1/1 even if the internal time was previously adjusted using the second information because the flag A2 is reset to 0. As a result, the second information (leap second information) is received again and stored in the leap second insertion data 515.

The specific day is set to 7/1 or 1/1 because the first choice for leap second insertion is the last day of December or June as determined by the IERS (International Earth Rotation and Reference Systems Service). More specifically, because the current leap second in the GPS signal is also updated to the new value on 7/1 or 1/1 when a leap second is inserted, reception on the same day enables immediately acquiring the latest leap second value and setting the correct time.

The second choices for updating the leap second are the last days of March or September, and the third choice is the last day of any desired month. As a result, the process in FIG. 8 could also be performed on 4/1 and 10/1, or on the first day of every month, to receive the second information again.

In addition to the effect of the first embodiment, this second embodiment of the invention executes a process that resets the flag A2 to 0 on specific days on which the leap second may be updated, and can therefore force receiving the second information again even if it was received previously. As a result, if the leap second has been updated, the updated current leap second can be immediately acquired, the internal time data 520 can be updated to the correct UTC by adding the current leap second to the received GPS time, and the time data for display 530 can also be adjusted to the correct time.

Embodiment 3

A third embodiment of the invention is described next with reference to the flow charts in FIG. 9 and FIG. 10.

The first embodiment receives the current leap second information as the second information and adjusts the current time accordingly. This third embodiment of the invention receives the leap second insertion day and the updated leap second information in addition to the current leap second, and when updating the internal time using the third information, uses the current leap second if the internal time is before the leap second insertion day and time, and uses the updated leap second if the internal time is after the leap second insertion day and time. Note that because the leap second is inserted as the last second of the leap second insertion day, the leap second insertion day and time are automatically known once the leap second insertion day is determined.

Figure 9:
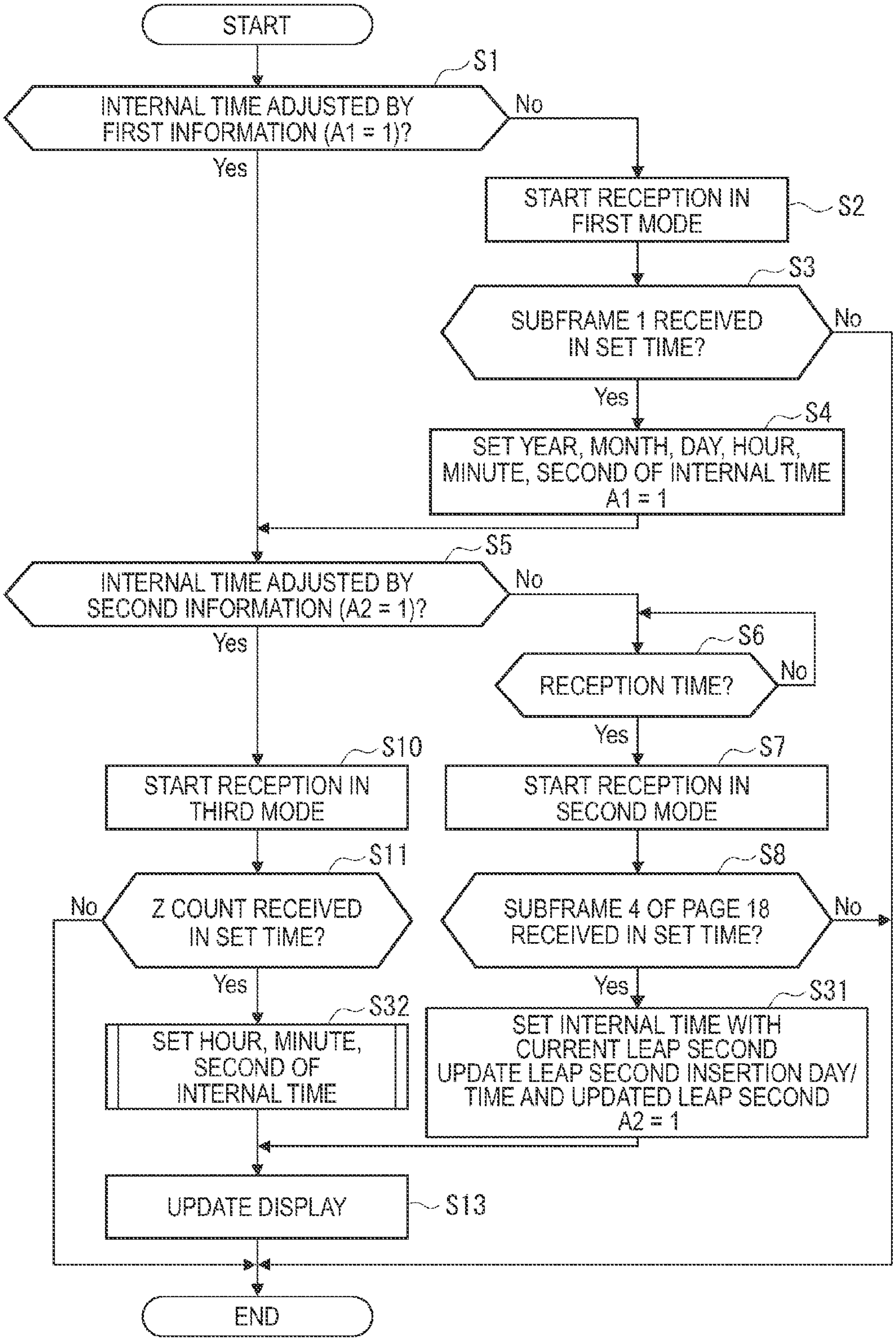
FIG. 9 is a flow chart of the reception process in a third embodiment of the invention.

Therefore, steps that are the same in FIG. 9 as in the first embodiment are identified by the same reference numerals, and further description thereof is omitted.

As shown in FIG. 9, steps S1 to S8, S10 and S11, and S13 are the same as in the first embodiment shown in FIG. 6.

If the second information (subframe 4 of page 18) was received and S8 returned Yes, the first embodiment stores the current leap second in the leap second insertion data 515, adjusts the internal time using this current leap second, and sets the flag A2 to 1 (S9).

This third embodiment, however, stores and updates the current leap second, the leap second insertion day (including the leap second insertion week and day), and the updated leap second in the leap second insertion data 515, adjusts the internal time with the current leap second, and sets the flag A2 to 1 (S31).

This embodiment thus differs from the first embodiment in also storing the leap second insertion day and the updated leap second in the leap second insertion data 515.

When the internal time is adjusted by receiving the third information (Z count), the first embodiment uses the current leap second stored in the leap second insertion data 515 to set the time (S12).

Figure 10:
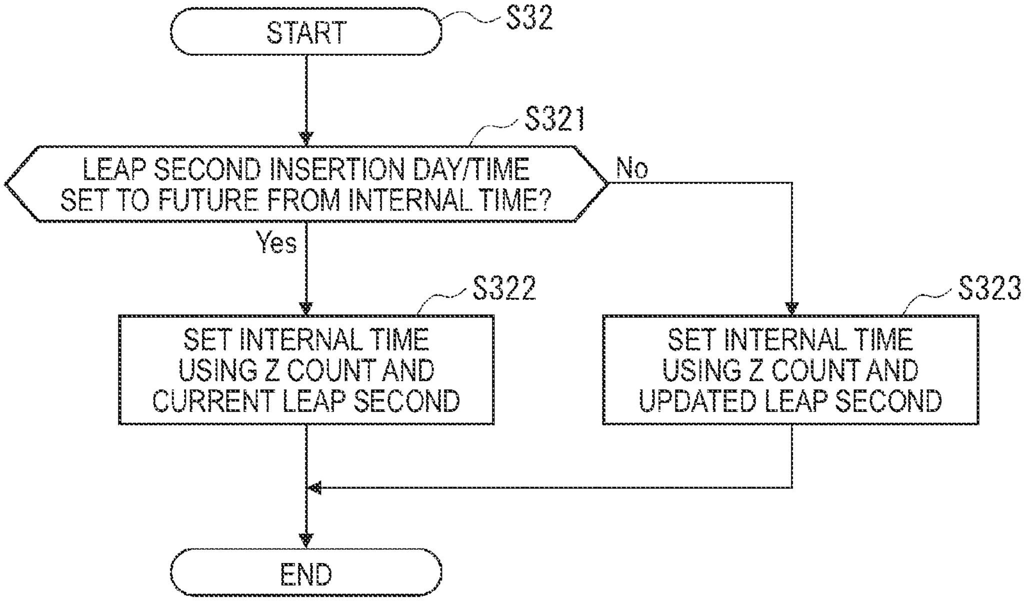
FIG. 10 is a flow chart of the internal time adjustment process in a third embodiment of the invention.

The internal time adjustment process of the hour, minute, second in this third embodiment (S32), however, uses the process shown in FIG. 10. More specifically, when step S32 runs, the third information time adjustment means 433 references the internal time data 520 and leap second insertion data 515, and determines if the leap second insertion day/time is in the future relative to the internal time (S321).

If S321 returns Yes, that is, the internal time is not after the leap second insertion day/time, the third information time adjustment means 433 adjusts the internal time using the received third information (Z count) and the current leap second (S322).

However, if S321 returns No, that is, the internal time is after the leap second insertion day/time, the third information time adjustment means 433 adjusts the internal time using the received third information (Z count) and the updated leap second (S323).

In addition to the effect of the first embodiment, this third embodiment of the invention also stores the leap second insertion day and updated leap second in the leap second insertion data 515, and can therefore set the correct time when the leap second insertion day/time has already passed without receiving the second information again.

Embodiment 4

A fourth embodiment of the invention is described next with reference to the flow chart in FIG. 11.

This fourth embodiment adds a process that receives the second information during a specific period before 7/1 and 1/1, which are candidate leap second insertion days, to the process of the third embodiment. Note that steps that are the same as in the third embodiment are identified in FIG. 11 with the same reference numerals, and further description thereof is omitted.

This specific period may be any period in which the leap second insertion day and updated leap second data is contained in the satellite signal, and may be from 3 months to the day before the candidate leap second insertion day, for example.

Figure 11:
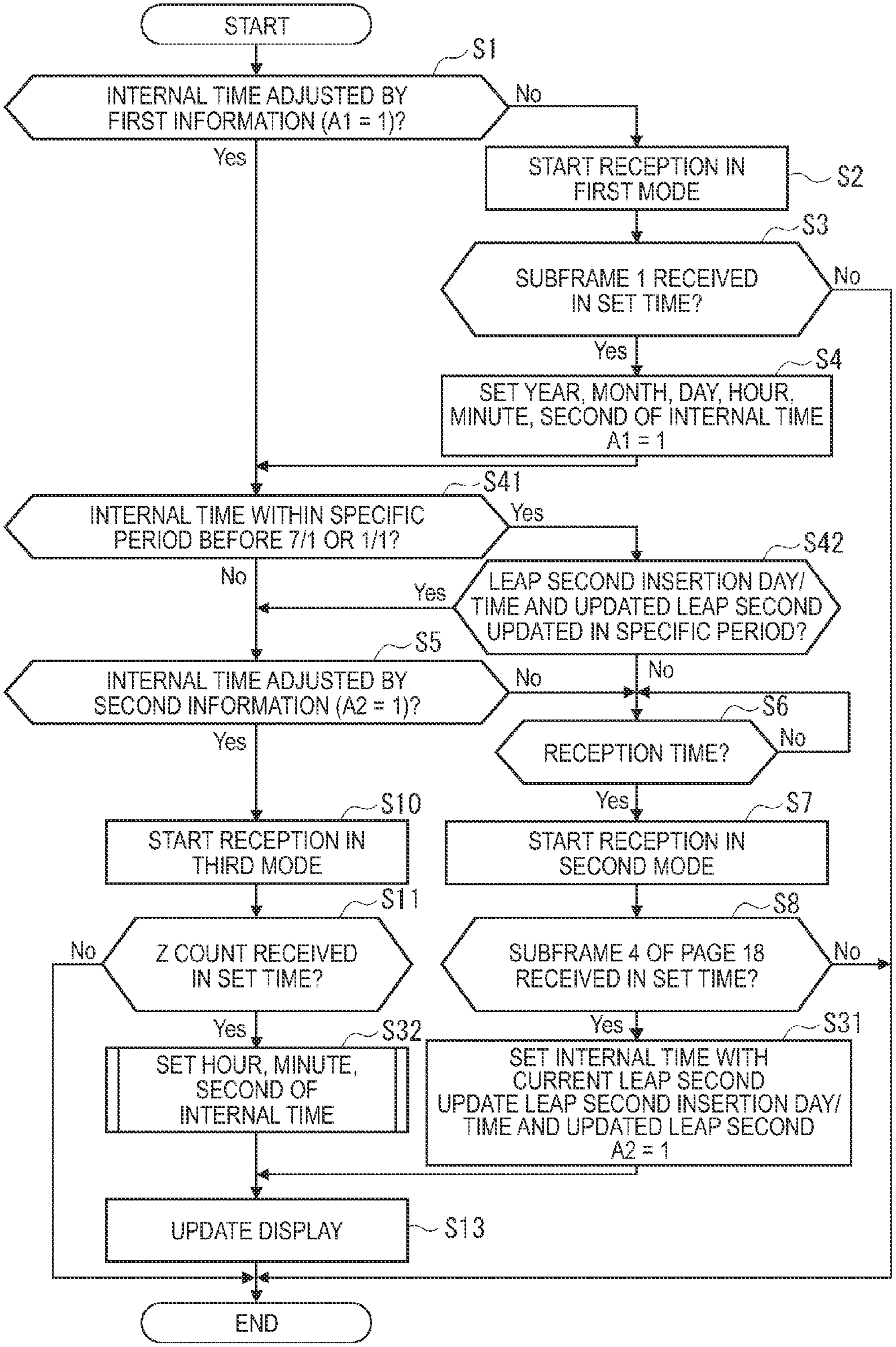
FIG. 11 is a flow chart of the reception process in a fourth embodiment of the invention.

As shown in FIG. 11, steps S1-S8, S10-S11, S13, S31, and S32 are the same as in the third embodiment shown in FIG. 9.

In addition, the time information adjustment unit 43 in this fourth embodiment of the invention determines if the internal time is in the specific period (a specific period before 7/1 or 1/1) (S41) before the decision step of S5.

If S41 returns No, control goes to the decision step of S5, and operation thereafter is the same as in the third embodiment.

However, if Yes is returned in S41, the time information adjustment unit 43 determines if the second information has already been received in this specific period, and the leap second insertion day and updated leap second already updated (S42).

If S42 returns Yes, control goes to the decision step of S5, operation thereafter is the same as in the third embodiment.

If S42 returns No, the time information adjustment unit 43 drives the second information time adjustment means 432 to execute the reception process in the second mode from S6.

This fourth embodiment of the invention achieves the same effect as the third embodiment, and also has the following effect.

More specifically, because the second information is received in the specific period, the new leap second insertion day and updated leap second data can be acquired, and the correct time can be set even when a leap second has been inserted.

More specifically, the leap second insertion day and updated leap second data are broadcast after inserting a leap second has been decided. As a result, the next leap second insertion day and updated leap second data is normally contained in the satellite signals from approximately six months before the leap second is to be updated. This information can therefore be acquired by acquiring the second information before the leap second is updated.

However, once the second information has been received and the internal time adjusted based thereon in the third embodiment, the second information is not received again. This means that if new leap second insertion day and updated leap second data are set after second information not containing the new data is received, the new information cannot be acquired because the second information is not received again.

However, because this fourth embodiment of the invention receives the second information in this specific period even if the second information was previously received, new leap second insertion information can be reliably received, and the correct time can be set after the leap second insertion day without receiving the second information.

Embodiment 5

Figure 12:
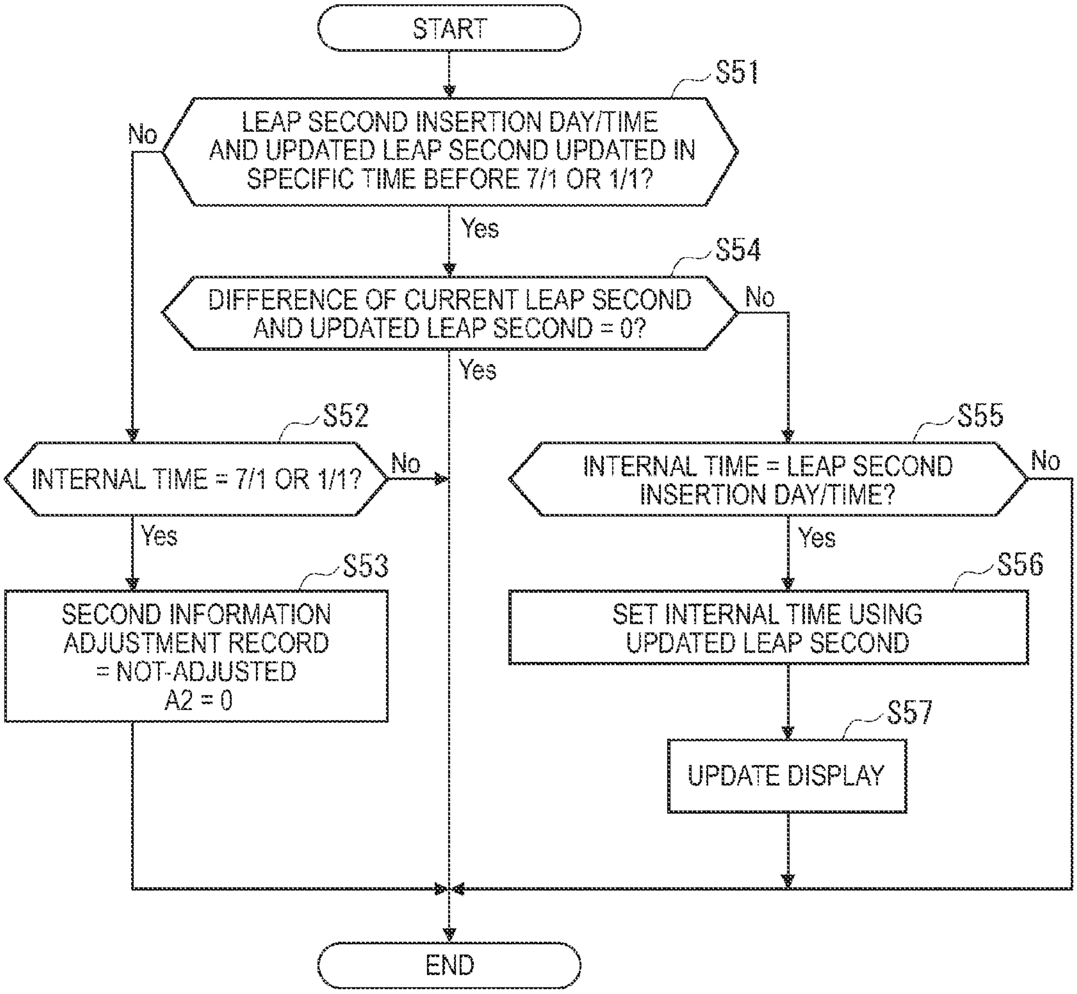
FIG. 12 is a flow chart of the reception process in a fifth embodiment of the invention.

A fifth embodiment of the invention is described next with reference to the flow chart in FIG. 12.

Similarly to the fourth embodiment, this fifth embodiment of the invention adds a process in a specific period before the leap second insertion day candidates of 7/1 and 1/1.

When the reception process starts, the time information adjustment unit 43 determines if the second information including the leap second insertion day and updated leap second data was received in a specific period and the leap second insertion data 515 was updated (S51).

If No is returned in S51, the time information adjustment unit 43 determines if the internal time is a specific date (7/1 or 1/1) (S52). If S52 returns Yes, the time adjustment recording means 434 sets the flag A2 to 0 (S53). More specifically, the second information adjustment record is set to not-adjusted (A2=0) even if the internal time was previously adjusted using the second information. As a result, when the process in FIG. 6 is then executed, No is returned in S5, the second information is received, and the latest leap second information can be acquired.

If S51 returns Yes, however, the time information adjustment unit 43 determines if the difference between the current leap second and the updated leap second in the leap second insertion data 515 is 0 (S54).

If S54 returns Yes, the time information adjustment unit 43 ends this specific period process because it can determine that a leap second will not be inserted on the next specific day. The process in FIG. 6 then executes, and the internal time is adjusted using the current leap second in S12.

If S54 returns No, the time information adjustment unit 43 references the internal time data 520 and leap second insertion data 515, and determines if the internal time has reached the leap second insertion day/time, that is, is after the leap second insertion day/time (S55).

If S55 returns Yes, the time information adjustment unit 43 adjusts the internal time using the updated leap second (S56) and updates the displayed time (S57).

If S55 returns No, that is, the internal time has not reached the leap second insertion day/time, and the time information adjustment unit 43 ends this specific period process. The time information adjustment unit 43 then runs the process in FIG. 6, and adjusts the internal time using the current leap second in S12.

This embodiment of the invention has the same effect as the preceding embodiments. More specifically, when the leap second information cannot be received in the specific period, the second information (leap second information) reception process can be executed by the operation of steps S52 and S53, and the internal time can be adjusted using the latest leap second information.

If the leap second information is received within the specific period, whether a leap second is to be inserted is determined in S54, and if it is not, the internal time can be adjusted using the current leap second received in the specific period when executing the reception process shown in FIG. 6.

If S54 determines that a leap second is to be inserted, the correct time can be set because the internal time is adjusted using the updated leap second after the leap second insertion day/time in S55 to S57.

Other Embodiments

The invention is not limited to the configurations of the embodiments described above, and various modifications are possible within the scope of the invention.

For example, a configuration that detects the reception environment and executes the reception process only if the reception environment is good is also conceivable. For example, the GPS wristwatch 100 according to this embodiment of the invention has a solar cell 22. GPS signals can also be received more easily outdoors than inside a building. Therefore, the open-circuit voltage of the solar cell 22, the charge current to the storage battery 24, the short-circuit current, or other parameter could be measured, whether the solar cell 22 is exposed to sunlight, that is, whether the GPS wristwatch 100 is outdoors or indoors, could be determined, and the reception process could be executed only if the GPS wristwatch 100 is outdoors. Alternatively, the GPS wristwatch 100 could be determined to be outdoors and the reception process run if the solar cell 22 output (open-circuit voltage, short-circuit current, or charge current) exceeds a specific threshold value continuously for a specific time.

By thus detecting the reception environment, the probability of successfully receiving the satellite signals can be improved, time information can be acquired, and the internal time data 520 can be correctly adjusted.

The second information in the foregoing embodiments includes the Z count (hour, minute, second) and leap second information, but could be only the leap second information. This is because the Z count is already received in the first information and does not need to be received again in the second information.

Figure 13:
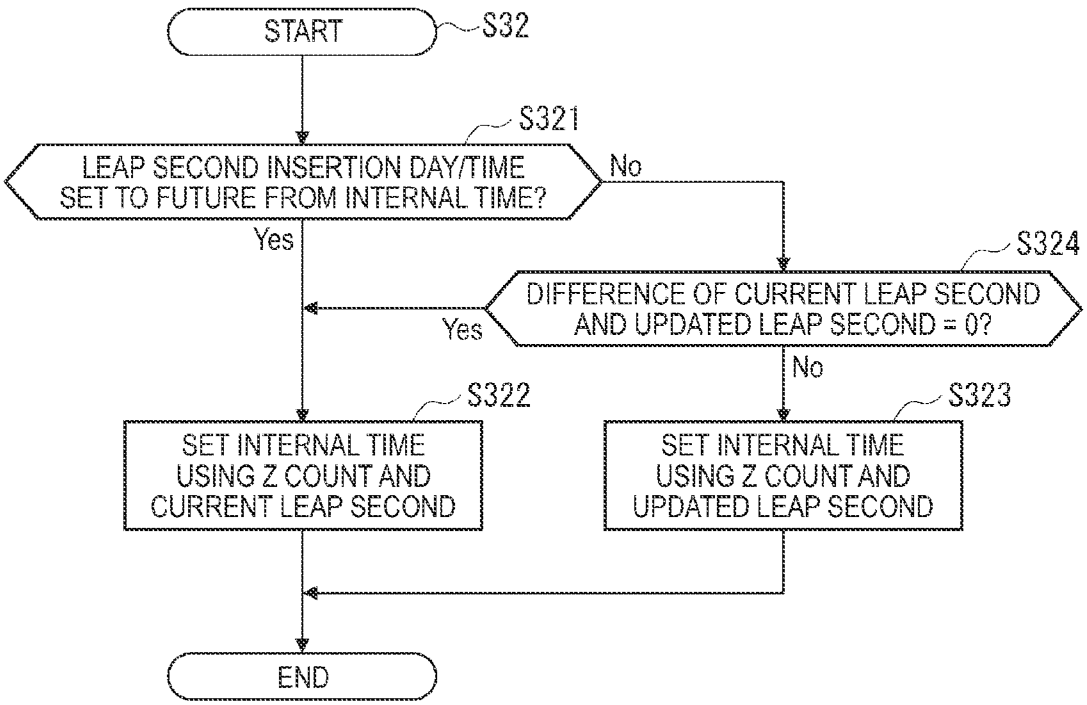
FIG. 13 is a flow chart of the internal time adjustment process in another embodiment of the invention.

In addition, in the hour, minute, second internal time adjustment process (S32) as shown in FIG. 13, if S321 returns No, whether the difference between the current leap second and the updated leap second in the leap second insertion data 515 is 0 is determined (S324), and S322 executes if S324 returns Yes and S323 executes if S324 returns No.

More specifically, because the current leap second and the updated leap second are the same if there is no difference between them, the internal time can be adjusted using the current leap second even if the leap second insertion day/time has passed.

A voltage detection means that detects the voltage of the storage battery 24 could also be included in each of the foregoing embodiments, and a mode that prohibits the reception process if the storage battery 24 voltage drops below a set voltage could be invoked.

The foregoing embodiments are described with reference to a GPS satellite as an example of a positioning information satellite, but the positioning information satellite of the invention is not limited to GPS satellites and the invention can be used with Global Navigation Satellite Systems (GNSS) such as Galileo (EU), GLONASS (Russia), and Beidou (China), and other positioning information satellites that transmit satellite signals containing time information, including the SBAS and other geostationary or quasi-zenith satellites.

The time adjustment device according to the invention is not limited to use in wristwatches (electronic timepieces), and can be widely used in battery-powered devices that receive satellite signals transmitted from positioning information satellites, including cell phones and portable GPS receivers used in mountain climbing, for example.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A time adjustment device comprising:

a reception unit that receives satellite signals transmitted from positioning information satellites;

a time information generating unit that generates internal time information;

a time information adjustment unit that adjusts the internal time information; and a reception control unit that controls operation of the reception unit;

wherein satellite time information that is kept by the positioning information satellites is contained in the satellite signal;

the reception unit can select a first reception mode that receives first information including hour, minute, and second information, week information for the year, month, and day, and satellite health information from the satellite signal, a second reception mode that receives second information including leap second information in the satellite signal, and a third reception mode that receives third information including hour, minute, and second information in the satellite signal;

the leap second information in the second information includes at least current leap second information;

the time information adjustment unit includes a first information time adjustment means that receives the first information by the reception control unit controlling the reception unit in the first reception mode, and adjusts the year, month, day, hour, minute, and second of the internal time information based on the received first information, a second information time adjustment means that receives the second information by the reception control unit controlling the reception unit in the second reception mode, and adjusts the internal time information based on the received second information, a third information time adjustment means that receives the third information by the reception control unit controlling the reception unit in the third reception mode, and adjusts the hour, minute, second of the internal time information based on the received third information and leap second information, and a time adjustment recording means that records in a storage unit if the internal time information was adjusting using the first information, and if the internal time information was adjusting using the second information, after the internal time information was initialized; and the first information time adjustment means operates if adjustment of the internal time information by the first information is not recorded in the storage unit, the second information time adjustment means operates if adjustment of the internal time information by the first information is recorded and adjustment by the second information is not recorded in the storage unit, and the third information time adjustment means operates if adjustment of the internal time information by the first information and second information is recorded in the storage unit.

2. The time adjustment device described in claim 1, wherein:

the time information adjustment unit sets the record of internal time being adjusted by the second information in the storage unit to not-adjusted when the internal time information reaches a previously set specific time.

3. The time adjustment device described in claim 1, wherein:

the leap second information in the second information includes leap second insertion day and updated leap second information in addition to the current leap second information;

the second information time adjustment means adjusts the internal time information using the current leap second information; and the third information time adjustment means adjusts the internal time information using the current leap second information if the internal time is before the leap second insertion day and time, and adjusts the internal time information using the updated leap second if the internal time is after the leap second insertion day and time.

4. The time adjustment device described in claim 1, wherein:

the leap second information in the second information includes leap second insertion day and updated leap second information in addition to the current leap second information;

the second information time adjustment means adjusts the internal time information using the current leap second information; and the third information time adjustment means adjusts the internal time information using the current leap second information if the internal time is before the leap second insertion day and time, adjusts the internal time information using the current leap second information if the internal time is after the leap second insertion day and time and the current leap second information and the updated leap second information are the same, and adjusts the internal time information using the updated leap second information if the internal time is after the leap second insertion day and time and the current leap second information and the updated leap second information are different.

5. The time adjustment device described in claim 3, wherein:

if the internal time information is within a specific period before a preset specific day and time, the time information adjustment unit determines if the second information was received in the specific period, and receives the second information if it was not received.

6. The time adjustment device described in claim 5, wherein:

if the second information could not be received in the specific period, the time information adjustment unit sets the record in the storage unit of the internal time being adjusted by the second information to not-adjusted when the internal time reaches the preset specific day and time.

7. A timekeeping device with a time adjustment device, comprising:

the time adjustment device described in claim 1; and a time display unit that displays the internal time information.

8. A time adjustment method comprising:

a time information generating step that generates internal time information;

a first information time adjustment step that receives first information including hour, minute, and second information, week information for the year, month, and day, and satellite health information in signals transmitted from positioning information satellites, and adjusts the internal time information based on the received first information;

a second information time adjustment step that receives second information including leap second information in the satellite signal, and adjusts the internal time information based on the received second information;

a third information time adjustment step that receives third information including hour, minute, and second information in the satellite signal, and adjusts the internal time information based on the received third information;

a time adjustment recording step that records in a storage unit if the internal time information was adjusting using the first information, and if the internal time information was adjusting using the second information, after the internal time information was initialized;

wherein the leap second information in the second information includes at least current leap second information, the first information time adjustment step executes if adjustment of the internal time information by the first information is not recorded in the storage unit, the second information time adjustment step executes if adjustment of the internal time information by the first information is recorded and adjustment by the second information is not recorded in the storage unit, and the third information time adjustment step executes if adjustment of the internal time information by the first information and second information is recorded in the storage unit.

* * * * *